United States Patent [19]

McCalister

[11] 3,838,662
[45] Oct. 1, 1974

[54] THROTTLE POSITION INDICATOR DEVICE

[76] Inventor: William J. McCalister, 4642 N. 31 St., Phoenix, Ariz. 85016

[22] Filed: Jan. 18, 1974

[21] Appl. No.: 434,395

[52] U.S. Cl. .............................. 116/114 G, 74/526
[51] Int. Cl. .......................................... G01d 21/00
[58] Field of Search ........ 116/114, 74; 74/513, 514, 74/539, 560; 123/103; 137/351

[56] References Cited
UNITED STATES PATENTS

| | | | |
|---|---|---|---|
| 2,732,729 | 1/1956 | Joyce | 116/114 R |
| 2,825,418 | 3/1958 | Kershman | 116/114 R |
| 2,841,033 | 7/1958 | Fields | 74/526 |
| 3,204,735 | 9/1965 | Heinrich | 74/526 X |

Primary Examiner—Louis J. Capozi
Attorney, Agent, or Firm—William H. Drummond; Don J. Flickinger

[57] ABSTRACT

A device for indicating to the driver of a motor vehicle when the throttle has been advanced to a predetermined position has an arm operatively associated with the accelerator pedal. One end of the arm advances along a track in response to pedal movement. A detent carried upon the track engages the arm when the end thereof has advanced a predetermined distance.

1 Claim, 5 Drawing Figures

PATENTED OCT 1 1974

THROTTLE POSITION INDICATOR DEVICE

This invention relates to motor vehicle accessories.

In a further aspect, the invention concerns an accessory for use in connection with the throttle system of a motor vehicle.

More particularly, the present invention concerns a device to provide an indicator to the driver of a motor vehicle when the throttle has been advanced to a predetermined position.

The prior art is replete with motor vehicle accessories which reputedly favorably affect fuel economy. Generally, these deivces may be classified as either engine adjuncts or driver aids. Engine adjuncts, typified by ignition intensifiers and air injectors, once installed are permanent engine modifiers functioning integrally therewith. Driver's aids, such as manifold pressure gauges and tachometers, monitor the engine for the driver's consideration.

While engine modifiers may increase engine efficiency and thereby decrease fuel requirements, the imprudent or unaware driver can largely nullify the effectiveness of such devices. Basically, this is accomplished by applying pressure to the throttle pedal that exceeds the instant requirement. Examples include rapid starts, attaining high engine speeds before shifting the transmission and utilizing full throttle for mild vehicle speed increases.

Engine monitoring devices indicate to the driver when optimum operating conditions have been obtained or exceeded, thereby providing a guide to economical driving. The savings are realized not only in fuel, but also in other vehicle components. However, such instruments are generally expensive to purchase, require the services of skilled technician and special tools to install, and require periodic maintenance. Many vehicle owners are not desirous of incurring the initial investment. Others, having had a device installed, cannot watch the instrument constantly, forget either to utilize the device or the significance of the readings, or simply ignore the device after the initial novelty has waned.

It would be highly advantageous, therefore, to provide an improved driver aid device.

Accordingly, it is a principle object of the instant invention to provide a device for assisting the driver of a motor vehicle in driving economically.

Another object of the invention is to provide a driver aid device in the embodiment of a throttle position indicator.

Still another object of the invention is the provision of a throttle position indicator which will provide an indication to the driver of a motor vehicle when the throttle has been advanced to a selective predetermined position.

Yet another object of the invention is the provision of a driver aid device which is responsive to throttle pedal movement and will positively alert the driver when the throttle has been advanced to the predetermined position.

Yet still another object of the present invention is to provide a throttle position indicator which cannot be ignored by the driver, yet can be readily overridden when driving conditions necessitate doing so.

A further object of the present invention is the provision of a driver aid device which is readily adjustable to suit the requirements of the particular installation and which may be conveniently transferred by the driver to a subsequent vehicle.

Still a further object of the invention is the provision of a driver aid device of the above type which is relatively economical to manufacture, readily installed without special skills or tools, and exceedingly reliable in operation.

Briefly, to achieve the desired objects of the throttle position indicator device of the present invention, provided is an arm which is operatively associated with the accelerator pedal of a motor vehicle. The free end of the arm rests upon a track supported by the vehicle and is caused to move along the track in response to movement of the throttle pedal. When the end of the arm has advanced a predetermined distance along the track, it is engaged by a detent.

When the detent engages the end of the arm, the driver has an immediate indication that the throttle has been advanced to a predetermined position. Increased pressure upon the accelerator pedal will readily overcome the engagement of the detent. To reduce friction between the track and the arm, the free end of the arm may support an anti-friction device, such as a rotatable ball or roller.

The previously stated and further and more specific objects and advantages of the present invention will become readily apparent to those skilled in the art from the following detailed description thereof taken in conjunction with the drawings, in which.

Figure 1:
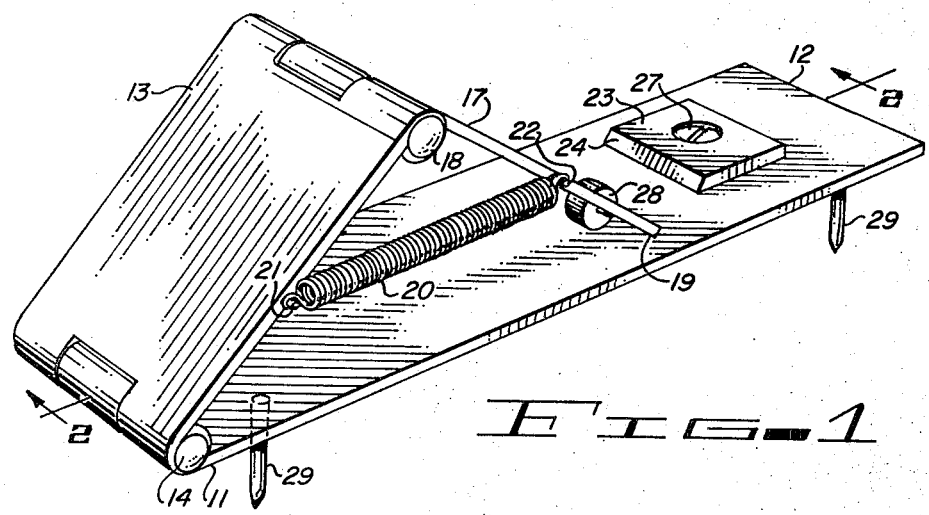
FIG. 1 is a perspective view of a throttle position indicator device constructed in accordance with the teachings of the present invention.

Turning now to the drawings, in which the same reference characters indicate corresponding elements throughout the several views, attention is first directed to FIG. 1, which shows the throttle position indicator device having an elongate base 10 with a first end 11 and a second end 12. The primary purpose of the base 10 is to provide a track, as will be hereinafter described in detail. A hinge member 13 is pivotally connected to the first end 11 of the base 10 by a hinge pin 14. The hinge member 13 is normally directed upwardly over the base 10 toward the second end 12. An arm 17 pivotally secured to the hinge member 13 by pivot pin 18 has the end 19 thereof directed to the base 10. A tension spring 20, engaged with pins 21 and 22 carried by the hinge member 13 and the arm 17, respectively, normally urges the end 19 of the arm 17 toward the first end 11 of the base 10.

A detent 23, having a bevelled edge 24 directed toward the end 11, is secured to the base 10 by a bolt 27. A roller 28, carried by the arm 17, eliminates frictional contact between the end 19 and the base 10. The portion of the base 10 upon which the roller 28 moves, is designated the track. As illustrated, the detent 23 is carried upon the track to engage the roller 28 as the end 19 of the arm 17 moves toward the end 12 of the base 10. It is also noted that spike cleats 29 depend from the base 10.

Figure 2:
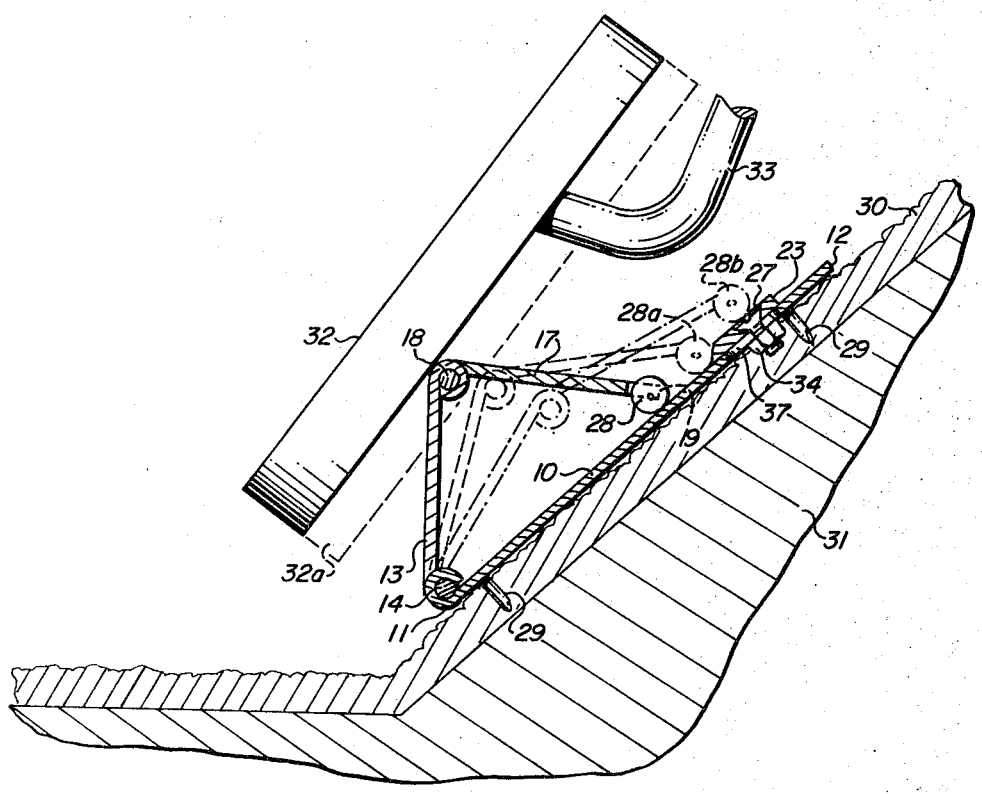
FIG. 2 is a fragmentary vertical sectional view of the accelerator pedal area of a motor vehicle having the device of FIG. 1 installed therewith, the device being shown in vertical section taken along the line 2—2 of FIG. 1.

Referring now to FIG. 2, it is seen that the cleats 29 engage the carpeting 30 covering the floorboards 31 to secure the throttle position indicator device to the motor vehicle. Generally, automobile carpeting includes a heavy tightly woven pile and backing which is laid over a thick insulating mat bonded to the floorboard providing sufficient depth and rigidity for proper engagement of the cleats 29. The accelerator pedal 32 is spaced from the carpeting 30 by a pivotally suspended pedal arm 33. Variously, the accelerator pedal is secured directly to the floorboard 31 by a hinge at the lower end of the pedal. However, the movement of the accelerator pedal 12 is analogous and does not alter either the structure or the function of the throttle position indicator device of the present invention. As more clearly illustrated herein, the detent 23 is secured to the base 10 by the bolt 27 and a nut 34. A slot 37 permits movement of the bolt therein for lateral adjustment of the detent along the track.

As previously described, the end 19 of the arm 17 is normally urged toward the end 11 of the base 10 by the spring 20. Stop means, as are conventionally known in the hinge art, can be employed to limit the minimum angle between the hinge member 13 and the arm 17 to restrict the movement of the end 19 towards the end 11. It is not necessary, then that the junction of the hinge member 13 and the arm 19 abut the underside of the accelerator pedal 32 when the pedal is in the normal rest position. As the accelerator pedal 32 is urged downwardly by the driver's foot, the throttle position indicator device responds by advancing the end 19 of the arm 17 along the track toward the end 12 of the base 10. Sufficient movement of the throttle pedal 32 to the position as shown by the dashed outline 32a advances the free end 19 until the roller engages the detent 23, as shown by the dashed outline 28a.

The movement of the pedal 32 prior to the roller 28 engaging the detent 23 is adjustably variable, either by the placement of the throttle position indicator device or movement of the detent 23 along the track. The movement of the accelerator pedal 32 is directly associated with the advancement of the engine throttle and is selectively determined in accordance with the vehicle owner's requirements. It can be set, for example, for optimum acceleration wherein the vehicle can move from a standing start at an adequate rate of acceleration without unnecessary fuel consumption, spinning wheels, or undue wear on the various components. It can also be set to coincide with the activation of the carburetor accelerator pump or the opening of the secondary throttles of a multi-carburetor arrangement. The further use includes setting at normal highway cruising speed. The device, however, does not limit the accelerator pedal movement since additional pressure on the accelerator pedal will cause the roller 28 to override the detent 23 to the position shown by the dashed outline 28b.

Figure 3:
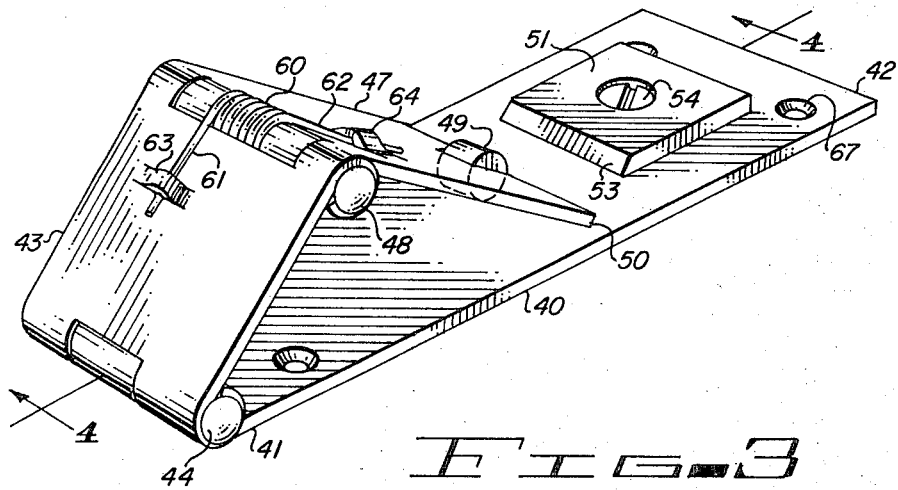
FIG. 3 is an alternately preferred embodiment of the present invention.
Figure 4:
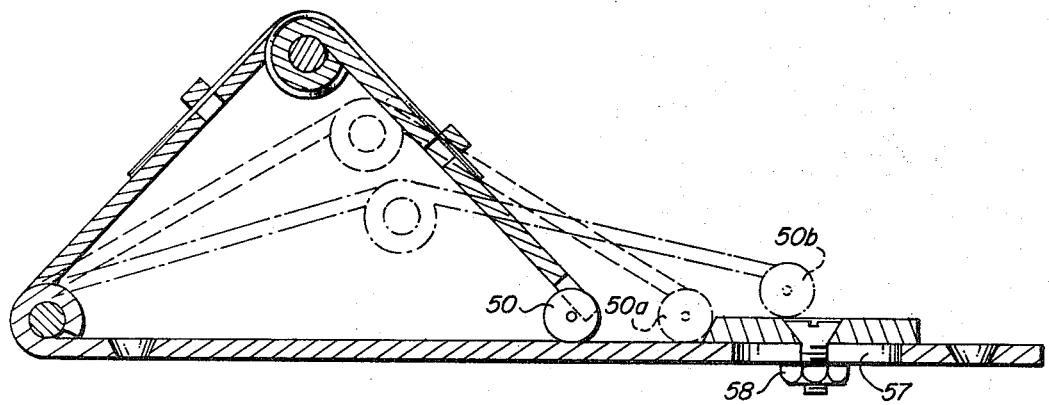
FIG. 4 is a vertical sectional view taken along the line 4—4 of FIG. 3 and specifically illustrating the movement and operation of the device thereof.
Figure 5:
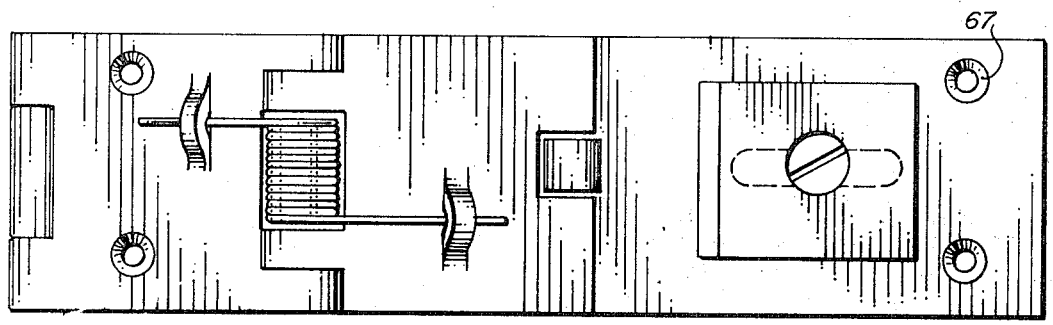
FIG. 5 is a horizontal plan view of the device of FIG. 3.

The alternately preferred embodiment of the throttle position indicator device of the present invention as illustrated in FIGS. 3–5 is generally similar to the embodiment of FIG. 1. Provided is a base 40 having a first end 41 and a second end 42. A hinge member 43, pivotally secured to the first end 41 by a hinge pin 44, supports an arm 47 privotally affixed thereto by a pivot pin 48. A roller 49 is carried by the free end 50 of the arm 47 to provide frictionless contact between the end 50 and the base 40. A detent 51, having a bevelled edge 53, is adjustably secured to the base 40 by a bolt 54 extending through slot 57 and engaging nut 58. A torsion spring 60 encircling the pivot pin 48 normally urges the end 50 of the arm 47 towards the end 41 of the base 40. The torsion spring 60 has arms 61 and 62 which engage the lugs 63 and 64 carried by the hinge member 43 and the arm 47, respectively. Countersunk holes 67 permit the device to be bolted directly to the floorboard of the vehicle. As specifically seen in FIG. 4, it is analogous to the description of FIG. 2, with the free end 50 advancing to the indicated positions 50a and 50b.

Various modifications and variations of the device as herein illustrated and described in detail will readily appear to those skilled in the art. Incidental modifications include removing the roller for direct contact of the end of the arm with the track and the detent, and various arm configurations. Similarly, the roller may be replaced with a captivated ball to provide frictionless contact. In a further modification, it is envisioned that the hinge member be discarded and the arm pivotally connected directly to the underside of the accelerator pedal.

Having fully described and disclosed the present invention and the preferred embodiment thereof in such clear and concise terms as to enable those skilled in the art to understand and practice the same, the invention claimed is:

I claim:

1. A throttle position indicator device responsive to accelerator pedal movement for providing an indication to the driver of a motor vehicle when the throttle has been advanced to a selective predetermined position, said indicator device comprising:
   a. a track supported by said vehicle;
   b. arm means operatively associated with said accelerator pedal for advancing one end of said arm along said track in response to movement of said pedal; and
   c. a detent carried upon said track to engage said end of said arm when said end has advanced a predetermined distance along said track.

* * * * *